United States Patent [19]
van Veldhuisen

[11] Patent Number: 5,884,750
[45] Date of Patent: Mar. 23, 1999

[54] APPARATUS FOR TRANSFERRING SUBSTANTIALLY ROUND, FRAGILE ARTICLES, SUCH AS FOR INSTANCE EGGS

[75] Inventor: Willem van Veldhuisen, Lunteren, Netherlands

[73] Assignee: FPS Food Processing Systems B.V., Netherlands

[21] Appl. No.: 965,796

[22] Filed: Nov. 7, 1997

[30] Foreign Application Priority Data

Nov. 29, 1996 [NL] Netherlands ............................ 1004657

[51] Int. Cl.[6] .................................................. B65G 47/04
[52] U.S. Cl. .................................... 198/476.1; 198/463.2; 198/449; 198/433; 198/377.02; 198/474.1
[58] Field of Search ..................................... 198/433, 449, 198/463.2, 476.1, 477.1, 377.01–377.04

[56] References Cited

U.S. PATENT DOCUMENTS 4,044,659  8/1977  Bardenhagen et al. .............. 198/474.1
4,462,201  7/1984  Nambu .
4,522,293  6/1985  Van Kattenbroek ............... 198/377.03
5,125,500  6/1992  Calibault ............................. 198/477.1
5,255,777  10/1993  Pawelko ............................. 198/476.4

FOREIGN PATENT DOCUMENTS 0588412  3/1994  European Pat. Off. .

Primary Examiner—Joseph E. Valenza
Assistant Examiner—Mark Deuble
Attorney, Agent, or Firm—Larson & Taylor

[57] ABSTRACT

An apparatus for transferring substantially round, fragile articles, such as for instance eggs, from a first conveyor to a second conveyor or vice versa, characterized in that the transfer takes place by means of a swivel lever according to a flowing path of movement, wherein in the starting point or end point respectively of the path of movement, the velocity and direction of movement of the article to be transferred correspond to the velocity and direction of movement of the first conveyor and wherein the velocity and direction of movement of the article in a transfer track correspond to those of the second conveyor.

7 Claims, 5 Drawing Sheets

APPARATUS FOR TRANSFERRING SUBSTANTIALLY ROUND, FRAGILE ARTICLES, SUCH AS FOR INSTANCE EGGS

The invention relates to an apparatus for transferring, in a transfer area, substantially round, fragile articles, such as for instance eggs or the like, from a first conveyor to a second conveyor or vice versa.

Such apparatus is described in European patent EP-A-0 588 412. A drawback of the known apparatus is that the capacity thereof is limited in that the articles are subjected to fairly abrupt changes of movement and velocity. In the known apparatus, a number of eggs are lifted, by means of a fork, from support elements and moved via this fork to the second conveyor, which is provided with grippers that are each adapted to pick up one article. To provide that the picking up of eggs by means of the fork is established in a controllable manner, it is necessary that the support elements on which the eggs are located be moved intermittently. Such intermittent movement requires that the eggs located on the support elements be accelerated and decelerated each time, which also has an adverse effect on the velocity of the machine, as the eggs must not fall from the support elements during this acceleration and deceleration. Moreover, accelerating and decelerating the support elements results in undesired machine vibrations. Further, the known apparatus has the drawback that the articles should first be transferred from the support element onto the fork, after which they are placed from the fork into a gripper again. Hence, essentially two transfer operations are involved that are each quite critical and entail the chance of breaking of the article to be transferred.

The object of the invention is to provide an apparatus of the type described in the opening paragraph, in such a manner that the above-described drawbacks do not occur.

The apparatus of the type mentioned in the opening paragraph is characterized in that the first conveyor comprises a number of support elements that are each adapted to carry one article, which first conveyor, at the location of the transfer area, moves at a first continuous velocity in a first conveying direction, wherein the second conveyor comprises a number of grippers that are each adapted to pick up one article, which second conveyor, at the location of the transfer area, moves at a second continuous velocity in a second conveying direction, wherein the second conveyor, at the location of the transfer area, extends above the first conveyor and the first and second conveying directions include an angle $\beta$ relative to each other, wherein each support element is connected via at least one swivel lever to the first conveyor, wherein each swivel lever is connected to a cam follower, wherein adjacent the transfer area a cam track is disposed adapted to cooperate with the cam followers to realize a swivel movement of the swivel levers, so that as a result of this swivel movement, the support elements move through a continuous and flowing path of movement, wherein the velocity and direction of movement of each support element in a starting point and end point of the path of movement correspond to the velocity and the conveying direction of the first conveyor, wherein the velocity and direction of movement of each support element at the location of a transfer track, where the article is transferred from the support element into a gripper of the second conveyor or vice versa, substantially correspond to the velocity and conveying direction of that relevant gripper.

In an apparatus of such design, the articles move through a continuously formed path of movement during the transfer from a support element of the first conveyor to a gripper in the second conveyor. The article to be transferred moves through this path of movement without undergoing any abrupt changes of velocity, so that the accelerations experienced by the article are minimal and the path can be moved through at high velocity, so that a particularly high transfer capacity can be established. Moreover, for the purpose of the transfer of the article, no intermediate transfer takes place, as is the case in the prior art. In one single movement, the articles are placed from the support elements of the first conveyor into the grippers of the second conveyor, so that only one transfer operation is necessary, so that the risk of breaking and/or loss of the article is limited to the absolute minimum. Because at the location of the transfer track, where the article is transferred from the support element into a gripper of the second conveyor or vice versa, the velocity and the direction of movement of a relevant support element substantially correspond to the velocity and conveying direction of an associated gripper, the transfer of the article from the support element to the gripper is particularly even and shockfree.

To create such path of movement, according to a further elaboration of the invention, each swivel lever is pivotable about a pivotal axis extending in a horizontal plane, wherein, during the swivel movement, each swivel lever is always in an imaginary vertical plane which extends perpendicularly to the pivotal axis and moves at a velocity and in a direction corresponding to the velocity and the conveying direction of the first conveyor, wherein the imaginary plane and the first conveying direction include an angle $\alpha$ relative to each other, wherein the tangent of this angle $\alpha$ meets the formula:

$$\tan(\alpha) = \frac{v2 \cdot \sin(\beta)}{v1 - v2 \cdot \cos(\beta)}$$

wherein:
V1 is the conveying velocity of the first conveyor;
V2 is the conveying velocity of the second conveyor; and
$\beta$ represents the angle between the first and the second conveying direction in the transfer area.

When the angle $\alpha$ is chosen so that the tangent thereof meets the above formula, it is possible to impart to the support elements, by a simple swivel movement of the lever, a direction of movement and a velocity corresponding to the second conveying direction and the second velocity. For this purpose, according to a further elaboration of the invention, the product of the angular velocity of the swivel movement at the location of the transfer track and the length of each swivel lever should substantially meet the following formula:

$$\omega \cdot L = V2 \cdot \frac{\sin(\beta)}{\sin(\alpha)}$$

wherein:
$\omega$ is the angular velocity of the swivel arm at the location of the transfer track;
L is the length of the swivel arm;
$\alpha$ represents the angle which the first conveying direction includes with the vertical plane in which the swivel arm swivels;
$\beta$ represents the angle which the first conveying direction includes with the second conveying direction; and
V2 is the conveying velocity of the second conveyor.

The angular velocity $\omega$ is determined by the form of the cam track and the velocity V2 of the first conveyor.

Further elaborations of the invention are described in the subclaims and will be specified on the basis of an exemplary embodiment, with reference to the accompanying drawings.

Figure 3:
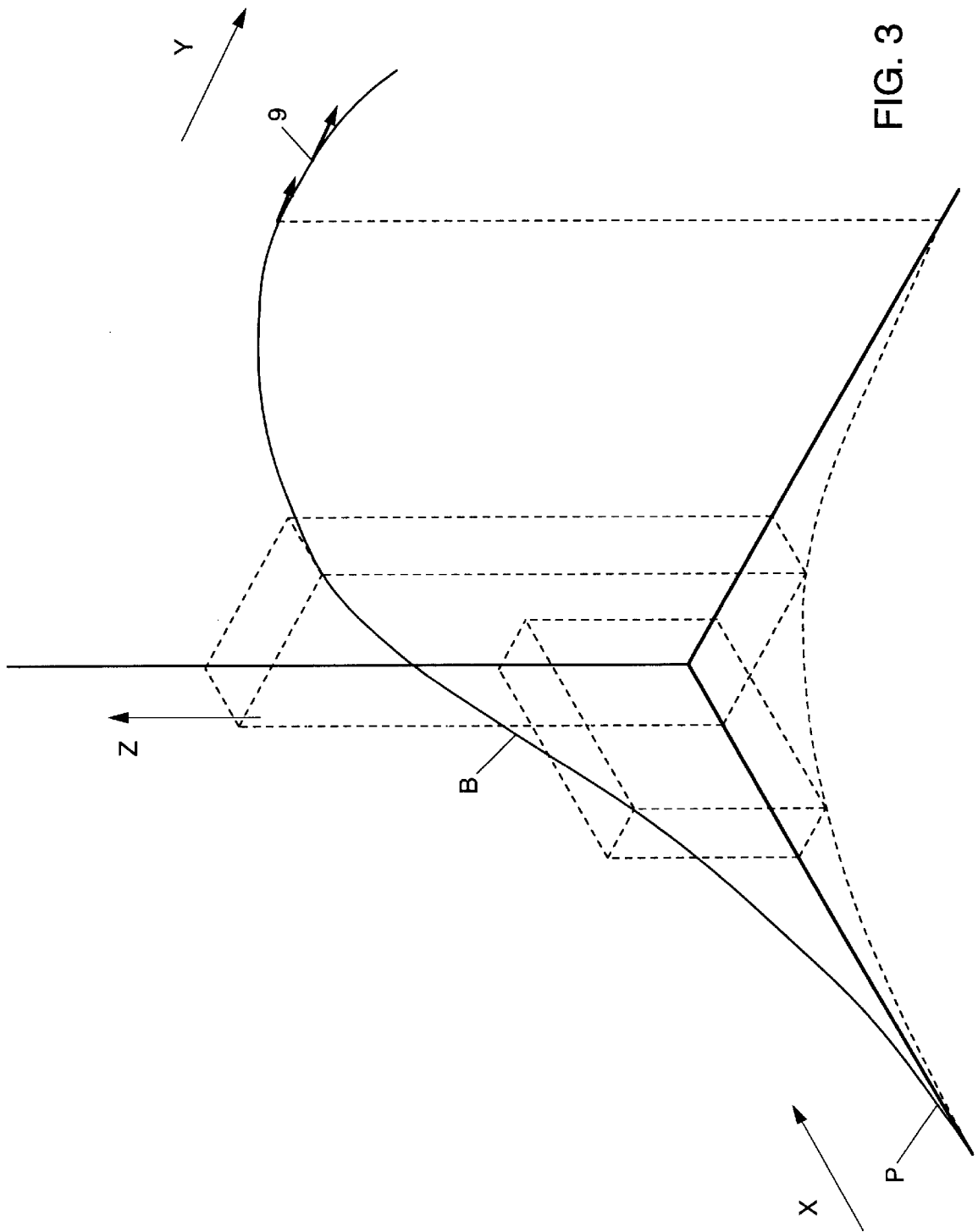
Figure 4A:
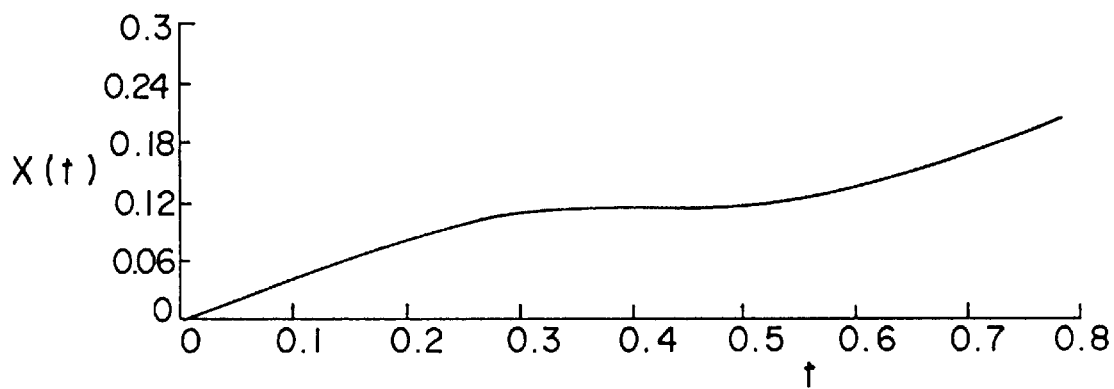
Figure 4B:
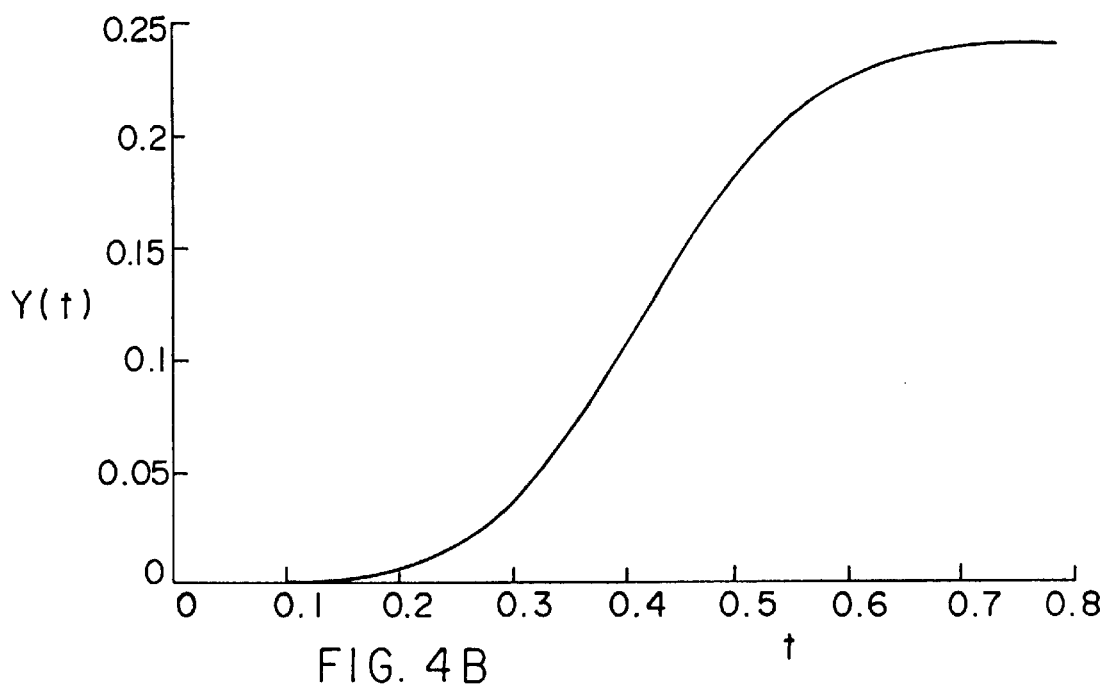
Figure 4C:
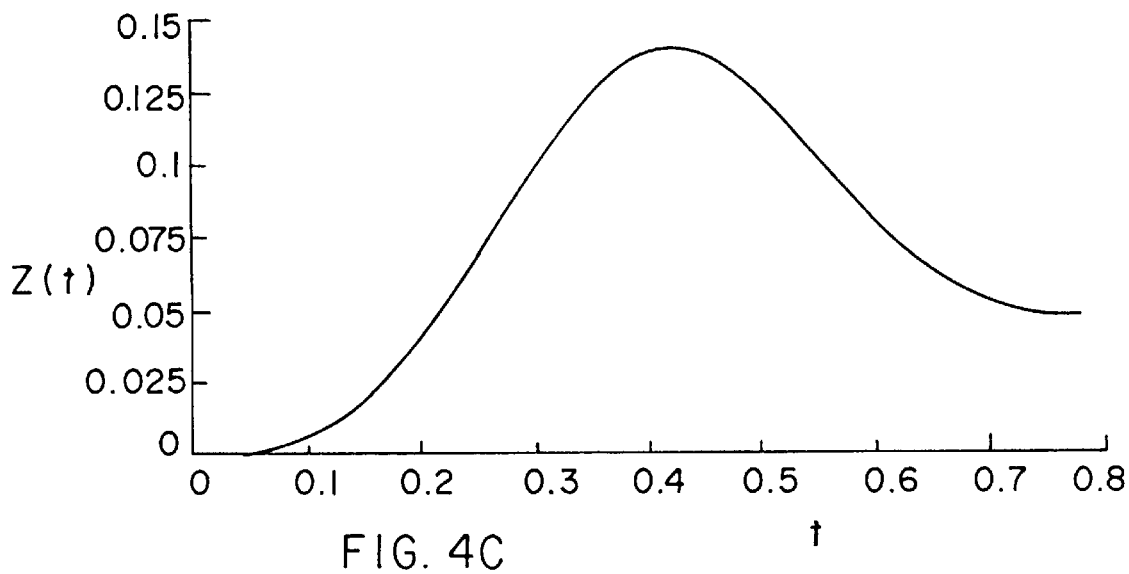
Figure 5:
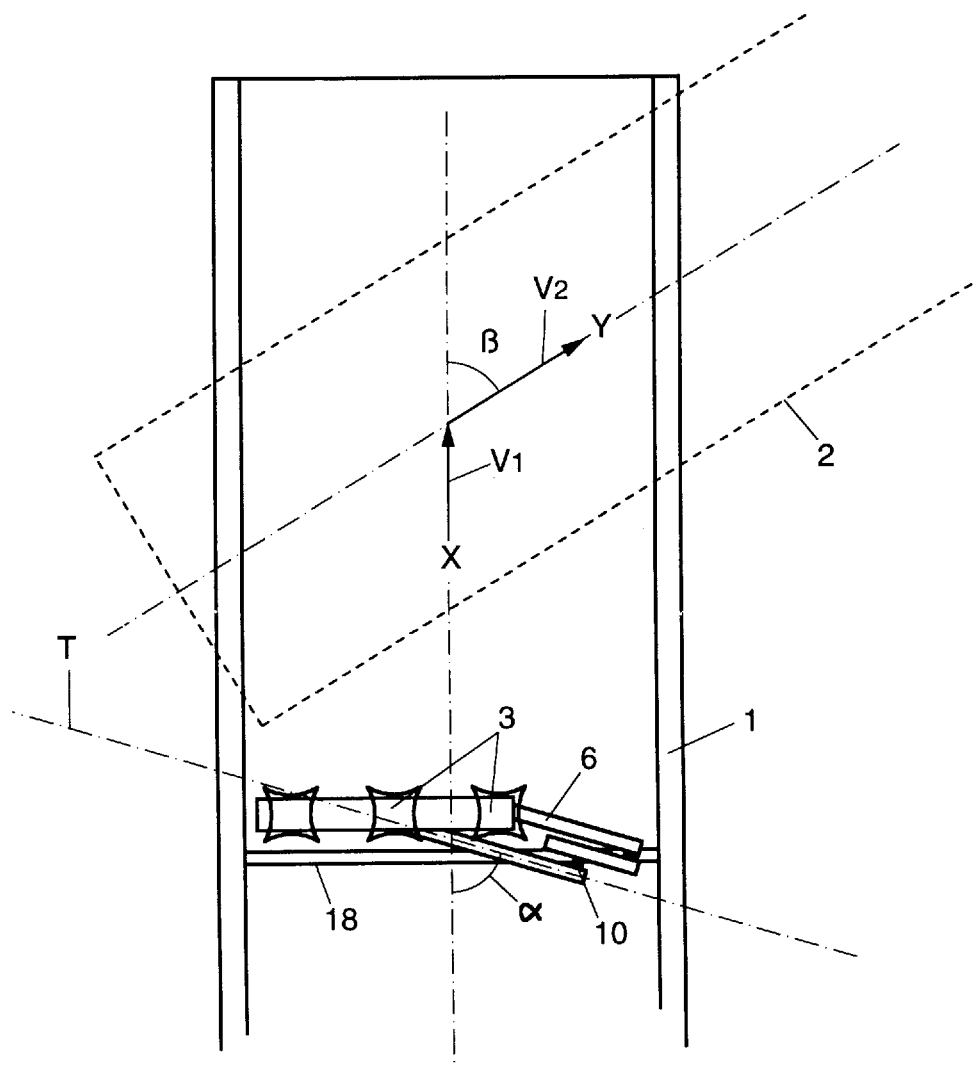

FIG. 3 schematically shows the form of the path followed by each support element;

FIG. 4 shows the distance in the different main directions travelled by each support element in the course of the path of movement as a result of the swivel movement and the continuous movement of the first conveyor; and FIG. 5 is a schematic top plan view of the first conveyor.

Figure 1:
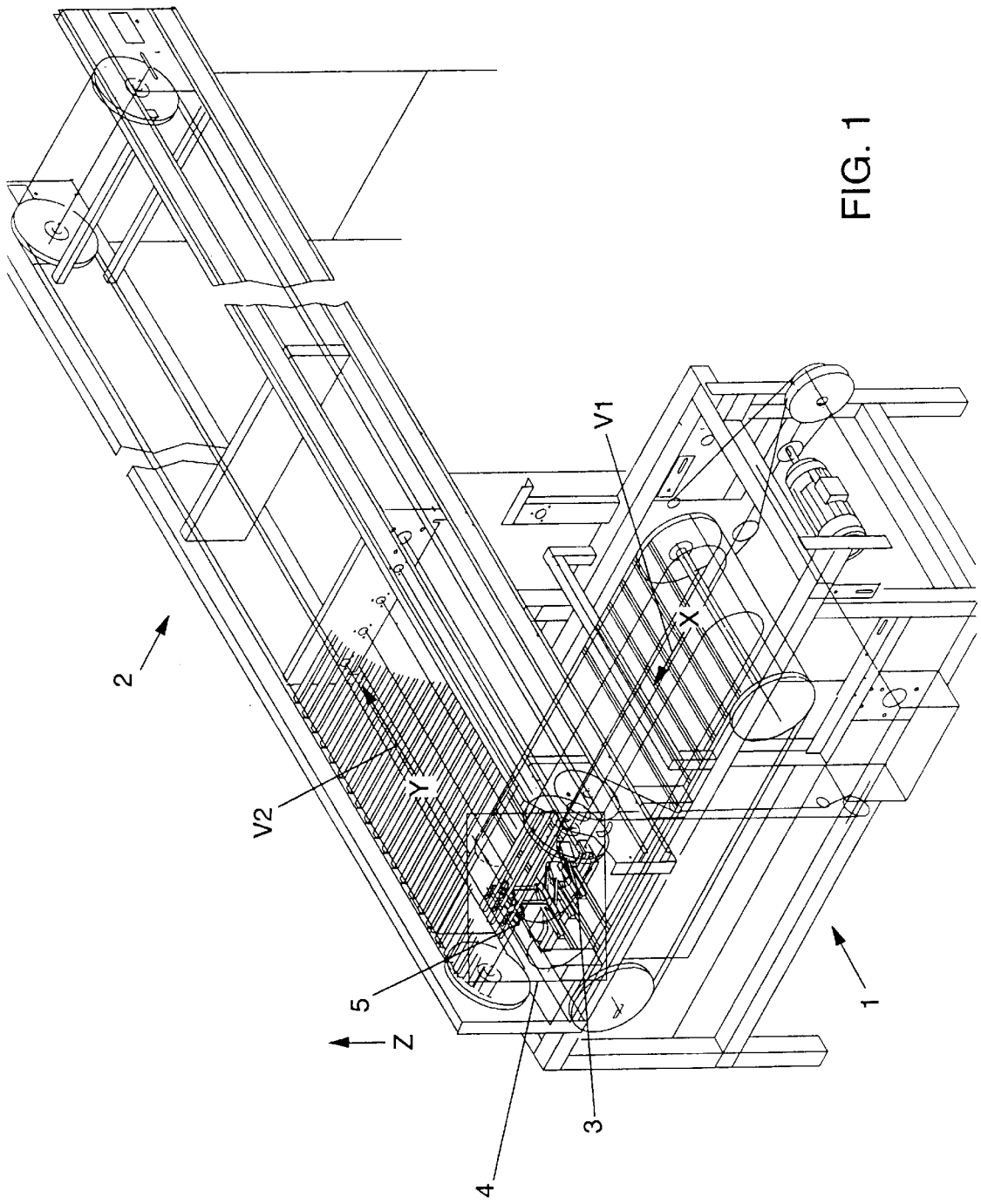
FIG. 1 is a perspective view of a first and a second conveyor extending perpendicularly to each other.

FIG. 1 shows an exemplary embodiment of the apparatus according to the invention for transferring in a transfer area substantially round, fragile articles, such as for instance eggs, fruit, tomatoes, light bulbs or the like. The apparatus comprises a first conveyor 1 and a second conveyor 2. The first conveyor 1 comprises a number of support elements 3, each adapted to carry one article. At the location of the transfer area 4, the first conveyor 1 travels in a first conveying direction X at a first continuous velocity V1. The second conveyor 2 comprises a number of grippers 5, each adapted to pick up one article. At the location of the transfer area, the second conveyor travels in a second conveying direction Y at a second continuous velocity V2. At the location of the transfer area 4, the second conveyor 2 extends above the first conveyor. The first and second conveying directions X and Y include an angle β relative to each other. In the exemplary embodiment shown in FIGS. 1 and 2, this angle β is 90°. In the exemplary embodiment of FIG. 5, β is less than 90°.

Figure 2:
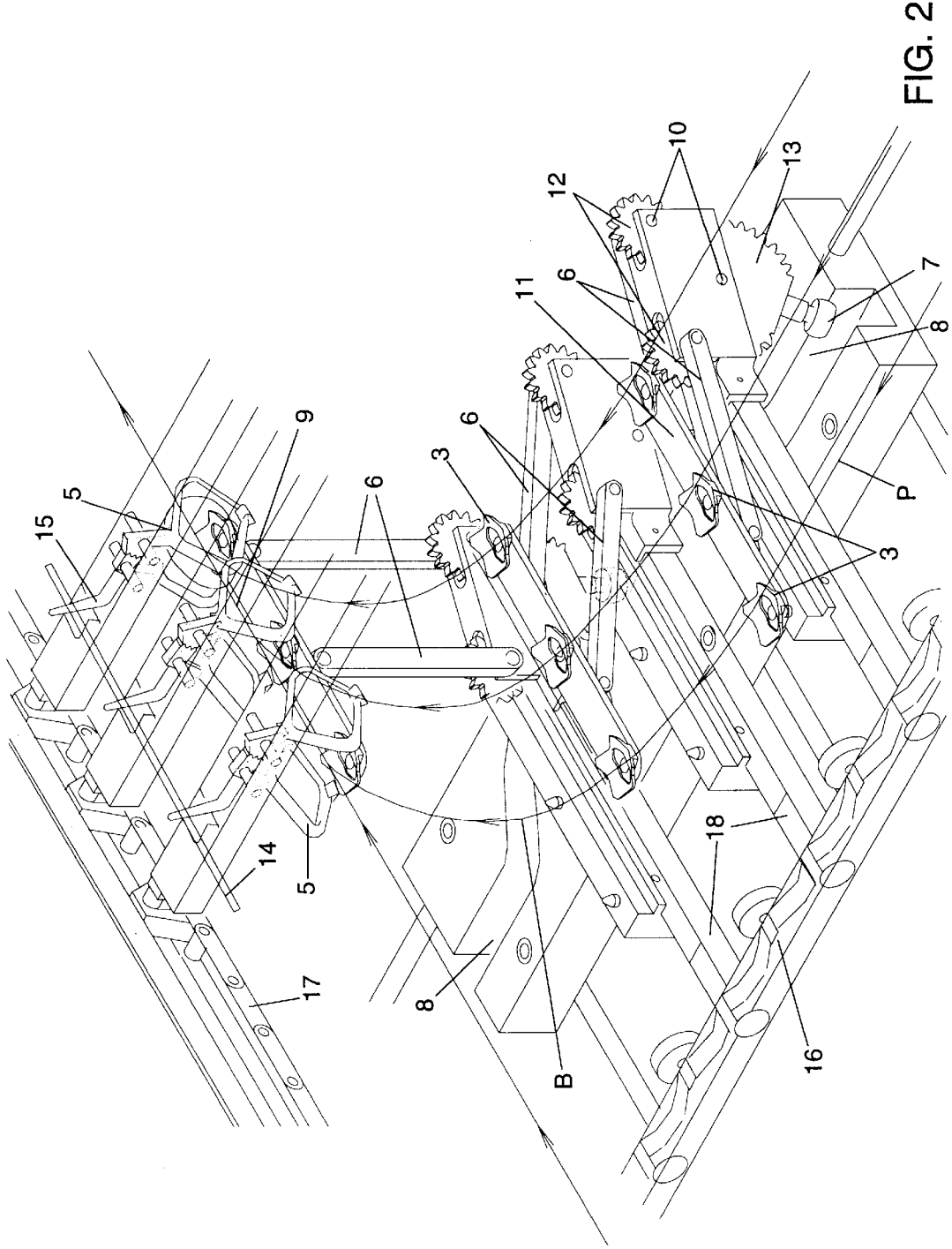
FIG. 2 shows a portion of the transfer area of the conveyors shown in FIG. 1.

As is clearly shown in FIG. 2, each support element 3 is connected, via at least one swivel lever 6, to the first conveyor 1. Each swivel lever 6 is in connection with a cam follower 7 cooperating with a cam track 8 arranged adjacent the transfer area 4. The cam followers 7 realize, in cooperation with the cam track 8, the swivel movement of the swivel levers 6 in such a manner that due to this swivel movement, the support elements 3 move through a continuous and flowing path of movement B. In a starting and end point P of the path of movement, the velocity and the direction of movement of each support element 3 correspond to the velocity V1 and the conveying direction X of the first conveyor 1. The point P is termed 'starting point' and 'end point' respectively, because when transfer takes place from conveyor 2 to conveyor 1, this point is an end point, and when transfer takes place from conveyor 1 to conveyor 2, this point P is a starting point of the path of movement B. The velocity and the conveying direction of each support element 3 at the location of a transfer track 9, where the article is transferred from the support element 3 into the gripper 5 of the second conveyor 2 or vice versa, and which transfer track 9 hence forms a part of the path of movement B, correspond to the velocity V2 and the conveying direction Y of the relevant gripper 5 or of the second conveyor 2.

As is clearly visible in FIGS. 2 and 5, each swivel lever 6 is pivotable about a pivotal axis 10 extending in a horizontal plane. During the swivel movement, each swivel lever 6 is always in an imaginary vertical plane T extending perpendicularly to the pivotal axis 10 and travelling at a velocity V1 in a direction X which corresponds to the velocity V1 and the conveying direction X of the first conveyor 1. The imaginary plane T and the second conveying direction X include an angle α relative to each other, with the tangent of this angle α meeting the following formula:

$$\tan(\alpha) = \frac{v2 \cdot \sin(\beta)}{v1 - v2 \cdot \cos(\beta)}$$

wherein:
V1 is the conveying velocity of the first conveyor;
V2 is the conveying velocity of the second conveyor; and
β represents the angle between the first and the second conveying direction in the transfer area.

When the two conveyors 1 and 2 extend perpendicularly to each other, the angle β is 90° and tangent α is hence equal to V2 divided by V1. In the transfer track, the velocity component in X-direction experienced by the support elements 3 due to the swivel movement is equal but opposite to the first conveying velocity V1. At least when the above formula is met, the velocity component of the support elements 3 in Y-direction experienced by the support elements due to the swivel movement corresponds to the velocity V2. To be able to realize this, it is necessary that the angular velocity ω of the swivel movement and the length of the swivel lever 6 meet certain conditions determined by the following formula:

$$\omega \cdot L = V2 \cdot \frac{\sin(\beta)}{\sin(\alpha)}$$

wherein:
ω is the angular velocity of the swivel arm at the location of the transfer track;
L is the length of the swivel arm;
α represents the angle which the first conveying direction includes with the vertical plane in which the swivel arm swivels;
β represents the angle which the first conveying direction includes with the second conveying direction; and
V2 is the conveying velocity of the second conveyor.

As is clearly visible in FIGS. 2 and 5, the support elements 3 are designed as dishes, with a number of dishes 3 being mounted on a dish support 11. The dish support 11 extends by a longitudinal center line in a horizontal plane and perpendicularly to the first conveying direction X, and is pivotally connected to two swivel levers 6. The swivel levers 6 extend parallel to each other in that they are each pivotally connected, via a pivotal axis, to the first conveyor 1, so that a parallelogram rod system is created. Each pivotal axis 10 of the two swivel levers 6 comprises a gear 12 fixedly connected thereto. The two gears 12 cooperate with a cam follower gear 13 which is fixedly connected to the cam follower 7 in such a manner that the position of the cam follower 7 determines the rotative position of the cam follower gear 13 and, accordingly, of the two swivel levers 6. The pivotal axes 10 and the cam follower gear 13 are bearing-mounted on a cross bar 18 of the conveyor 1, which cross bars 18 are connected to conveying chains 16. It is readily understood that the swivel movement of the swivel levers 6 can also be realized in a different manner. For instance, the cam follower gear 13 can be replaced by a gear rack having a cam, or use can be made of rod systems or geared belt transmissions or cable transmissions.

In general, the second conveyor 2 comprises a number of rows of grippers 5, which rows extend parallel to each other and in the second conveying direction Y. The dishes 3 of the first conveyor 1 are arranged in rows extending perpendicularly to the first conveying direction X, with the number of dish supports 11 per row of dishes 3 preferably corresponding to the number of rows of grippers 5 in the second conveyor 2. The apparatus comprises a number of cam tracks 8, which number corresponds to the number of rows of grippers 5 in the second conveyor. The cam tracks 8 in the first conveying direction are staggered in X-direction relative to each other. In an apparatus of such design, for instance six dishes 3 per row are present in the first conveyor 1, of which dishes the three on the left connect to a first cam follower 7 and the three on the right connect to a second cam follower 7. The second conveyor 2 for instance comprises two rows of grippers 5, extending parallel to each other in the second conveying direction Y. The left-hand cam track 8 is disposed so that the path of movement B leads to the first row of grippers 5 and a second cam track 8 is of such design that the three right-hand dishes 3 lead to the second row of grippers 5. In this manner, all kinds of combinations of rows of grippers 5 and rows of dishes 3 can of course be realized.

Of course, the grippers 5 should be brought from an open position into a closed position or vice versa at the right moment. For this purpose, according to a further elaboration of the invention, a number of gripper cam tracks 14 are provided, which number corresponds to the number of rows of grippers 5 in the second conveyor 2. The grippers 5 of the second conveyor 2 comprise control cams 15, which at least in the transfer area 4 cooperate with the gripper operating members 14 in such a manner that the grippers 5 in the transfer area 4 are brought from an open position into a closed position or vice versa.

The gripper operating members can be designed as cam tracks or as positively excited operating members such as, for instance, a rod following a path which path extends in a plane perpendicular to the longitudinal axis of the rod, with the rod extending in the second conveying direction. The path is chosen so that it intersects the path in which the control cams 15 travel. With such a construction, a number of grippers can be closed or opened at the same moment.

Reference is further made to the simplified top plan view of an exemplary embodiment of the apparatus in FIG. 5. In this simplified top plan view, the second conveyor 2 is shown in dotted lines, and the X-direction, the Y-direction, the angle β between the two conveyors 1, 2 and the angle α which each swivel arm 6 includes with the first conveying direction X are clearly shown. Moreover, an indication of the swivel plane T in which the swivel lever 6 is located is shown. This swivel plane T moves at a velocity V1 in the X-direction along with the swivel lever 6 and extends perpendicularly to the pivotal axis 10 of the relevant swivel lever 6. It is understood that when angle 3 is not 90°, the dish supports 11 during the swivel movement also have to follow an angular rotation of a magnitude of 90°-β in the horizontal plane.

FIG. 4 shows three graphs in which the path travelled by a support element in the different directions is plotted out against the time. From this, it can clearly be observed that around the point of time 0.4, the support element 3 in the X-direction is temporarily stationary and that around the same point of time, the support element 3 is at its highest point, which appears from the graph for the Z-direction. At that moment, the path travelled in Y-direction per unit of time is virtually constant and corresponds to the velocity V2. After T=0.5, the transfer is completed and the swivel arm moves slightly further to prevent the retardation forces that act on the mechanism from being too great. Next, somewhere in the return path of the first conveyor 1, each swivel lever 6 with the associated dish 3 can be swivelled back again into the starting position. In this starting position, the dishes 3 can pick up again a next article, which is passed to the transfer area 4.

It is readily understood that the invention is not limited to the exemplary embodiments described, but that various modifications are possible within the framework of the invention.

I claim:

1. An apparatus for transferring, in a transfer area, substantially round, fragile articles, such as for instance eggs or the like, from a first conveyor (1) to a second conveyor (2) or vice versa, characterized in that the first conveyor (1) comprises a number of support elements (3) that are each adapted to carry one article, said first conveyor (1), at the location of the transfer area (4), moving at a first continuous velocity (V1) in a first conveying direction (X), wherein the second conveyor (2) comprises a number of grippers (5) that are each adapted to pick up one article, said second conveyor (2), at the location of the transfer area (4), moving at a second continuous velocity (V2) in a second conveying direction (Y), wherein the second conveyor (2), at the location of the transfer area (4), extends above the first conveyor (1) and the first and second conveying directions (X and Y respectively) include an angle (β) relative to each other, wherein each support element (3) is connected via at least one swivel lever (6) to the first conveyor (1), wherein each swivel lever (6) is connected to a cam follower (7), wherein adjacent the transfer area (4) a cam track (8) is disposed adapted to cooperate with the cam followers (7) to realize a swivel movement of the swivel levers (6), so that as a result of said swivel movement, the support elements (3) move through a continuous and flowing path of movement (B), wherein the velocity and direction of movement of each support element (3) in a starting point or end point (P) respectively of the path of movement (B) substantially correspond to the velocity (V1) and the conveying direction (X) of the first conveyor (1), wherein the velocity and direction of movement of each support element (3) at the location of a transfer track (9), where the article is transferred from the support element (3) into a gripper (5) of the second conveyor (2) or vice versa, correspond to the velocity (V2) and conveying direction (Y) of said relevant gripper (5).

2. An apparatus according to claim 1, characterized in that each swivel lever (6) is pivotable about a pivotal axis (10) extending in a horizontal plane, wherein, during the swivel movement, each swivel lever (6) is always in an imaginary vertical plane (T) which extends perpendicularly to the pivotal axis (10) and moves at a velocity (V1) and in a direction (X) corresponding to the velocity (V1) and the conveying direction (X) of the first conveyor (1), wherein the imaginary plane (T) and the first conveying direction (X) include an angle (α) relative to each other, wherein the tangent (tan α) of said angle (α) meets the following formula:

$$\tan(\alpha) = \frac{v2 \cdot \sin(\beta)}{v1 - v2 \cdot \cos(\beta)}$$

wherein:

V1 is the conveying velocity of the first conveyor (1);

V2 is the conveying velocity of the second conveyor (2); and

β represents the angle between the first and the second conveying direction (X and Y respectively) in the transfer area.

3. An apparatus according to claim 2, characterized in that the product (ω.L) of the angular velocity (ω) of the swivel movement at the location of the transfer track (9) and the length (L) of each swivel lever substantially meets the following formula:

$$\omega \cdot L = V2 \cdot \frac{\sin(\beta)}{\sin(\alpha)}$$

wherein:
- ω is the angular velocity of the swivel arm (6) at the location of the transfer track (9);
- L is the length of the swivel arm (6);
- α represents the angle which the first conveying direction includes with the vertical plane (T) in which the swivel arm (6) swivels;
- β represents the angle which the first conveying direction includes with the second conveying direction; and
- V2 is the conveying velocity of the second conveyor.

4. An apparatus according to claim 1, characterized in that the support elements (3) are designed as dishes (3), wherein a number of dishes (3) are mounted on a dish support (11) which extends by a longitudinal center line in a horizontal plane and perpendicularly to the first conveying direction (X), and which is pivotally connected to two swivel levers (6), said swivel levers (6) extending parallel to each other in that they are each pivotally connected, via a pivotal axis (10), to the first conveyor (1), so that a parallelogram rod system is created.

5. An apparatus according to claim 4, characterized in that each pivotal axis (10) of the two swivel levers (6) comprises a gear (12) fixedly connected thereto, said two gears (12) cooperating with a gear rack or a cam follower gear (13) which is fixedly connected to the cam follower (7) in such a manner that the position of the cam follower (7) determines the position of the gear rack, respectively the rotative position of the cam follower gear (13) and, accordingly, of the two swivel levers (6).

6. An apparatus according to claim 4, characterized in that the second conveyor (2) comprises a number of rows of grippers (5), said rows extending parallel to each other and in the second conveying direction (Y), wherein the dishes (3) of the first conveyor (1) are arranged in rows extending perpendicularly to the first conveying direction (X), wherein the number of dish supports (11) per row corresponds to the number of rows of grippers (5) in the second conveyor (2), wherein the apparatus comprises a number of cam tracks (8), which number corresponds to the number of rows of grippers (5) in the second conveyor (2), wherein the cam tracks (8) are staggered relative to each other at least in the first conveying direction (X).

7. An apparatus according to claim 1, characterized by a second conveyor (2) having a number of rows of grippers (5) and comprising a number of operating members (14), said number corresponding to the number of rows of grippers (5) in the second conveyor (2), wherein the grippers (5) of the second conveyor (2) comprise control cams (15), which at least in the transfer area (4) cooperate with the said operating members (14) in such a manner that the grippers (5) in the transfer area (4) are brought from an open position into a closed position or vice versa.

* * * * *